(12) United States Patent
Kinoshita et al.

(10) Patent No.: US 9,321,416 B2
(45) Date of Patent: Apr. 26, 2016

(54) IN-VEHICLE BATTERY

(75) Inventors: Yukiko Kinoshita, Okegawa (JP); Naoto Todoroki, Sagamihara (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 451 days.

(21) Appl. No.: 13/821,460

(22) PCT Filed: Mar. 7, 2012

(86) PCT No.: PCT/JP2012/055744
§ 371 (c)(1),
(2), (4) Date: Mar. 7, 2013

(87) PCT Pub. No.: WO2012/124555
PCT Pub. Date: Sep. 20, 2012

(65) Prior Publication Data
US 2013/0162026 A1    Jun. 27, 2013

(30) Foreign Application Priority Data

Mar. 11, 2011    (JP) .................................. 2011-054090
Feb. 13, 2012    (JP) .................................. 2012-028462

(51) Int. Cl.
*B60R 16/04* (2006.01)
*B60L 11/18* (2006.01)
(Continued)

(52) U.S. Cl.
CPC . *B60R 16/04* (2013.01); *B60L 1/02* (2013.01); *B60L 11/1803* (2013.01);
(Continued)

(58) Field of Classification Search
CPC ............ Y02T 10/7005; Y02T 10/7077; Y02T 10/7061; B60R 16/03; B60R 16/0315; B60L 11/14; B60L 1/02; B60L 11/1803; B60L 11/1864; B60L 11/1875; B60L 11/1877; B60L 11/1879; H01M 10/615; H01M 10/625; H01M 10/647; H01M 10/6562; H01M 10/6571; H01M 2/1077; H01M 2/1083; H05B 2203/02
USPC .......................................................... 307/9.1
See application file for complete search history.

(56) References Cited

U.S. PATENT DOCUMENTS 7,964,827 B2    6/2011    Suzuki et al.
2008/0090137 A1*    4/2008    Buck et al. .................... 429/120
(Continued)

FOREIGN PATENT DOCUMENTS

JP    6-283215 A    10/1994
JP    9-161853 A    6/1997
(Continued)

OTHER PUBLICATIONS

Kinoshita, Y. US PTO Final Office Action dated Oct. 3, 2014, 12 pgs.
(Continued)

*Primary Examiner* — Thienvu Tran
*Assistant Examiner* — Brian K Baxter
(74) *Attorney, Agent, or Firm* — Foley & Lardner LLP

(57) ABSTRACT

In an in-vehicle battery of the present invention, a second battery module (13C) and a third battery module (13R) higher than the second battery module (13C) are disposed below a floor panel of a vehicle. The third battery module (13R) is provided adjacent to a rear side of the second battery module (13C) in a vehicle front-rear direction. The in-vehicle battery also includes a thin heater module (24) provided in each of two end regions, which are located above the third battery module (13R) in a vehicle up-down direction and include no middle region in a vehicle width direction, and configured to heat the third battery module (13R).

7 Claims, 4 Drawing Sheets

(51) Int. Cl.
*H01M 2/10* (2006.01)
*B60L 1/02* (2006.01)
*H01M 10/625* (2014.01)
*H01M 10/615* (2014.01)
*H01M 10/647* (2014.01)
*H01M 10/6571* (2014.01)
*H01M 10/6562* (2014.01)

(52) U.S. Cl.
CPC ........ *B60L 11/1864* (2013.01); *B60L 11/1875* (2013.01); *B60L 11/1877* (2013.01); *B60L 11/1879* (2013.01); *H01M 2/1077* (2013.01); *H01M 2/1083* (2013.01); *H01M 10/615* (2015.04); *H01M 10/625* (2015.04); *H01M 10/647* (2015.04); *H01M 10/6562* (2015.04); *H01M 10/6571* (2015.04); *H05B 2203/02* (2013.01); *Y02T 10/7005* (2013.01); *Y02T 10/7061* (2013.01)

(56) References Cited

U.S. PATENT DOCUMENTS

| | | | |
|---|---|---|---|
| 2008/0179315 A1 | 7/2008 | Suzuki et al. | |
| 2008/0198897 A1 | 8/2008 | Suzuki et al. | |
| 2009/0145676 A1* | 6/2009 | Takasaki et al. | 180/65.1 |
| 2009/0186266 A1* | 7/2009 | Nishino et al. | 429/120 |
| 2009/0197154 A1* | 8/2009 | Takasaki et al. | 429/83 |
| 2009/0236162 A1* | 9/2009 | Takasaki et al. | 180/68.5 |
| 2009/0242299 A1* | 10/2009 | Takasaki et al. | 180/68.5 |
| 2012/0055725 A1 | 3/2012 | Mizoguchi et al. | |
| 2012/0107665 A1* | 5/2012 | Abe et al. | 429/120 |
| 2012/0115001 A1* | 5/2012 | Hatta et al. | 429/100 |
| 2014/0004404 A1 | 1/2014 | Kinoshita et al. | |

FOREIGN PATENT DOCUMENTS

| | | | |
|---|---|---|---|
| JP | 2000-243435 A | 9/2000 |
| JP | 2007-213939 A | 8/2007 |
| JP | 2008-47371 A | 2/2008 |
| JP | 2008-186621 A | 8/2008 |
| JP | 2010-238519 A | 10/2010 |
| JP | 2011-6051 A | 1/2011 |
| JP | 2011-14436 A | 1/2011 |
| JP | 2011-23292 A | 2/2011 |
| WO | WO 2010/136863 A1 | 12/2010 |
| WO | WO 2011/007537 A1 | 1/2011 |

OTHER PUBLICATIONS

Korean Office Action dated Feb. 7, 2014,(5 pgs.)
USPTO Office Action, U.S. Appl. No. 14/004,296, Feb. 13, 2015, 15 pages.
Kinoshita et al., US PTO Office Action dated Jun. 6, 2014, 12 pgs.
Canadian Office Action dated Oct. 8, 2014, 3 pgs.
USPTO Final Office Action, U.S. Appl. No. 14/004,296, dated Jun. 8, 2015, 18 pages.
USPTO Non-Final Office Action, U.S. Appl. No. 14/004,296, dated Dec. 15, 2015, 13 pages.

* cited by examiner

_US 9,321,416 B2_

IN-VEHICLE BATTERY

TECHNICAL FIELD

The present invention relates to an in-vehicle battery including battery modules and a thin heater module.

BACKGROUND ART

Heretofore, an in-vehicle battery including a thin heater module as described in Patent Document 1 has been known, for example.

The thin heater module described in Patent Document 1 has a heater main body located adjacent to an outer surface of a battery pack case which has a large number of battery modules housed therein. A heat insulation sheet is interposed between the heater main body and a heater unit case opposed to the heater main body.

PRIOR ART DOCUMENT

Patent Document

Patent Document 1: Japanese Patent Application Publication No. 2008-186621

SUMMARY OF INVENTION

However, the thin heater module described in Patent Document 1 is designed to heat the battery pack case by means of the heater main body to heat the battery modules indirectly through heat transfer from the battery pack case to the battery modules. For this reason, there is a problem that the efficiency of heating the battery modules is poor.

An objective of the present invention is to provide an in-vehicle battery capable of enhancing the heating efficiency.

In order to solve the above problem, in an in-vehicle battery of the present invention, one battery module, a different battery module, and a heater module are disposed below a floor panel of a vehicle. The different battery module is adjacent to one side of the one battery module in a vehicle front-rear direction and formed higher than the one battery module. In addition, the heater module is provided in each of two end regions, which are located above the different battery module in a vehicle up-down direction and include no middle region in a vehicle width direction, and configured to heat the different battery module.

DESCRIPTION OF EMBODIMENTS

Figure 1:
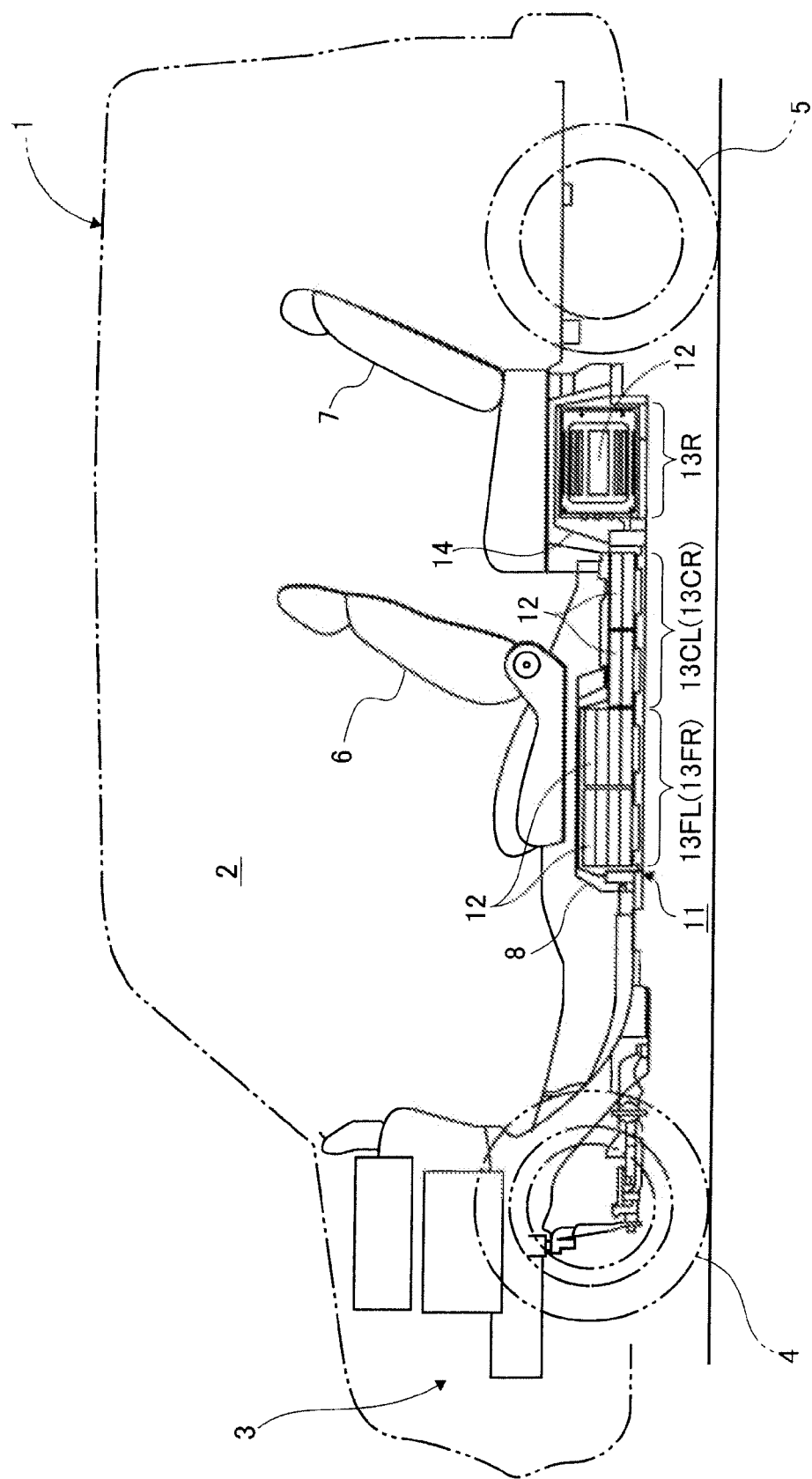
FIG. 1 is a side view of a vehicle in a state where a battery pack according to an embodiment of the present invention is disposed below a floor panel.
Figure 2:
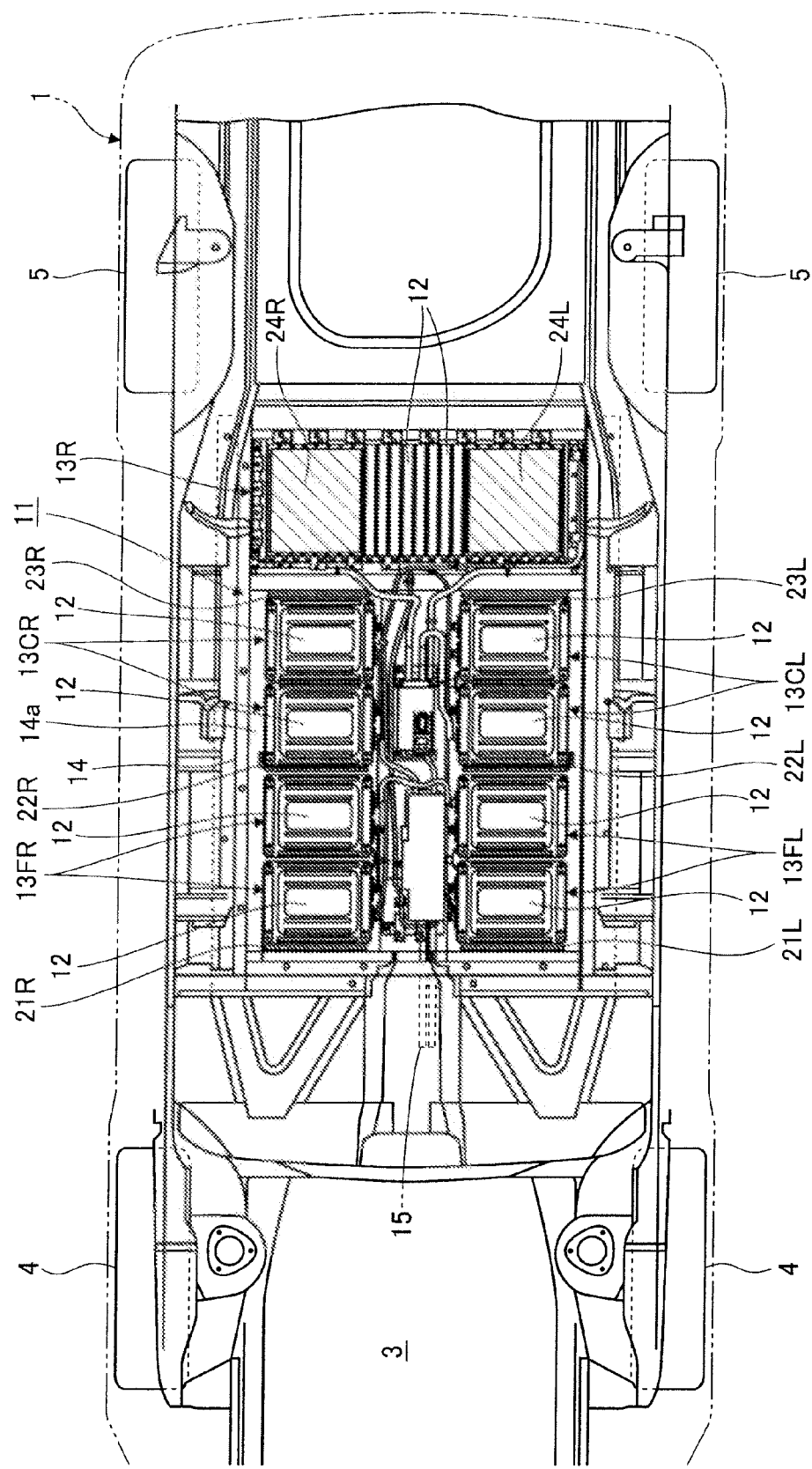
FIG. 2 is a plan view of FIG. 1, showing a state where the floor panel is detached from FIG. 1.
Figure 3:
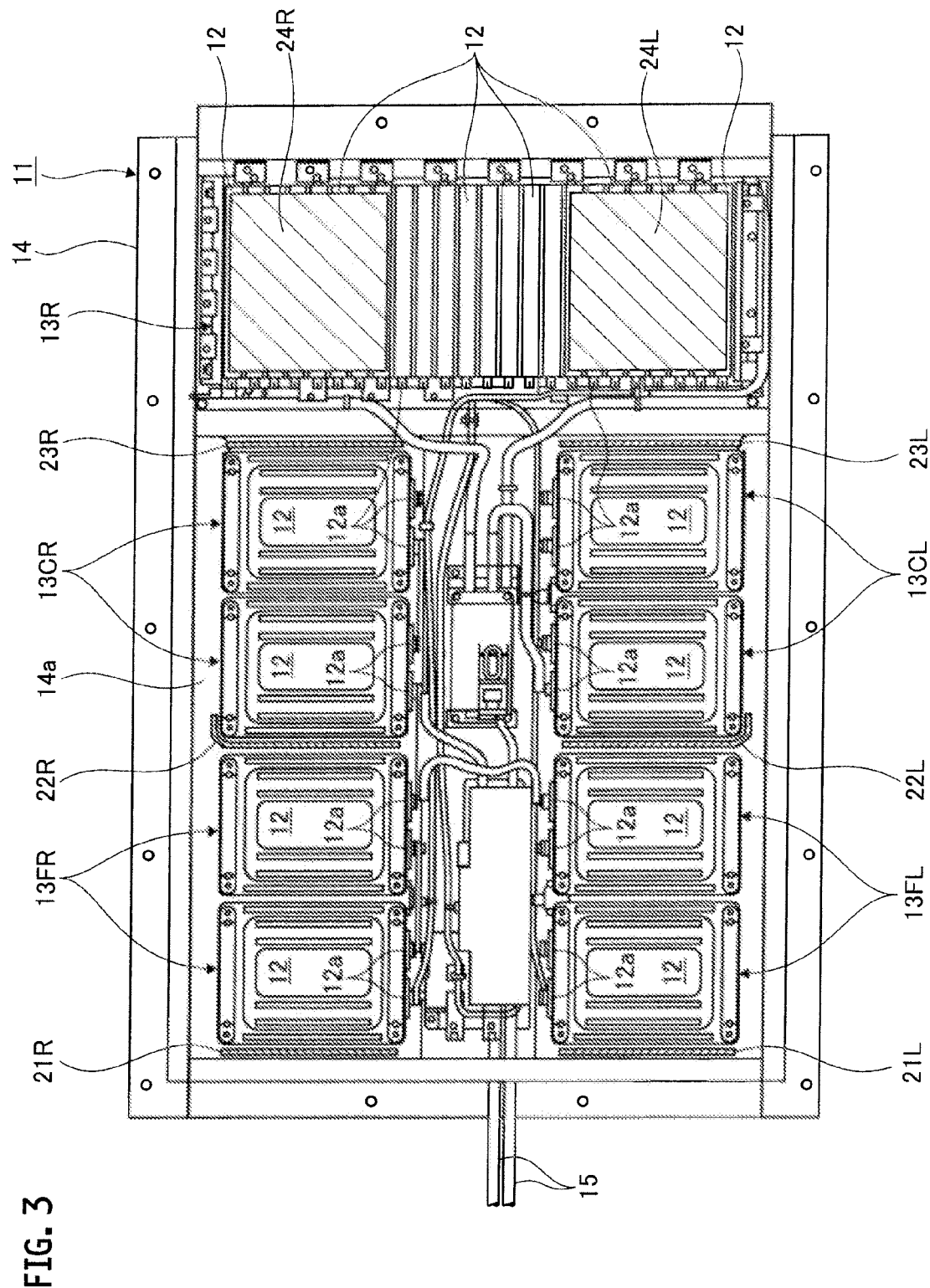
FIG. 3 is an enlarged view of the battery pack shown in FIG. 2.

To begin with, a battery pack shown in FIGS. 1 to 3 is described. In FIGS. 1 and 2, reference numeral 1 indicates a vehicle body; 2 a vehicle cabin; 3 a motor room having an electric motor for traveling mounted therein; 4 left and right front wheels; 5 left and right rear wheels; 6 front seats; 7 rear seats; 8 a floor panel; and 11 a battery pack.

The battery pack 11 is a unit including: first battery modules 13FL, 13FR disposed on a front side of a vehicle in a vehicle front-rear direction; second battery modules 13CL, 13CR (one battery module) disposed on a middle side of the vehicle in the vehicle front-rear direction; and a third battery module 13R (a different battery module) disposed on a rear side of the vehicle in the vehicle front-rear direction. These battery modules 13FL, 13FR, 13CL, 13CR, 13R are disposed below the floor panel 8 while housed in a battery pack case 14 shown in FIG. 3.

More specifically, as shown in FIGS. 1 and 2, the battery pack 11 includes: the first battery modules 13FL, 13FR disposed below the left and right front seats 6 respectively; the third battery module 13R disposed below the left and right rear seats 7; and the second battery modules 13CL, 13CR disposed immediately below a portion of the floor panel 8 between the set of left and right front seats 6 and the set of left and right rear seats 7.

As shown in FIGS. 1 to 3, the first battery module 13FL located on the front left side is made by arranging two battery modules side by side in the front-rear direction, the battery modules each having four horizontally-placed battery shells 12 stacked in an up-down direction. Likewise, the first battery module 13FR located on the front right side is made by arranging two battery modules side by side in the front-rear direction, the battery modules each having four horizontally-placed battery shells 12 stacked in the up-down direction.

As shown in FIGS. 1 to 3, the third battery module 13R located at the rear is made by stacking a large number of vertically-placed battery shells 12 in a vehicle width direction to a length substantially equal to the total length of the rear seats 7.

As shown in FIGS. 1 to 3, the second battery module 13CL located on the middle left side is made by arranging two battery modules side by side in the front-rear direction, the battery modules each having two horizontally-placed battery shells 12 stacked in the up-down direction. Likewise, the second battery module 13CR located on the middle right side is made by arranging two battery modules side by side in the front-rear direction, the battery modules each having two horizontally-placed battery shells 12 stacked in the up-down direction.

As shown in FIG. 3, the first battery modules 13FL, 13FR are respectively disposed in directions such that electrode terminals 12a of the battery shells 12 constituting the first battery module 13FL on the left side are opposed to electrode terminals 12a of the battery shells 12 constituting the first battery modules 13FR on the right side (i.e., such that the electrode terminals of both of the battery modules are directed toward the center in the vehicle width direction).

In addition, as shown in FIG. 3, the third battery module 13R located at the rear is disposed in such a way that electrode terminals 12a of the battery shells 12 are all directed forward with respect to the vehicle.

Further, as shown in FIG. 3, the second battery modules 13CL, 13CR located at the middle left and right are disposed in directions such that electrode terminals 12a of the battery shells 12 constituting the second battery module 13CL on the left side are opposed to electrode terminals 12a of the battery shells 12 constituting the second battery module 13CR on the right side (i.e., such that the electrode terminals of both of the battery modules are directed toward the center in the vehicle width direction).

Besides, as shown in FIGS. 2 and 3, the electrode terminals 12a of the battery shells 12 constituting the battery modules 13FL, 13FR, 13CL, 13CR, 13R are connected to motor power supply cables 15, which come from the electric motor (inverter) in the motor room 3, through power cables. The power cables are routed in a space located in a middle portion in the vehicle width direction and between the first battery modules 13FL, 13FR located at the front left and right, and in a space located in the middle portion in the vehicle width direction and between the second battery modules 13CL, 13CR located at the middle left and right.

Figure 4:
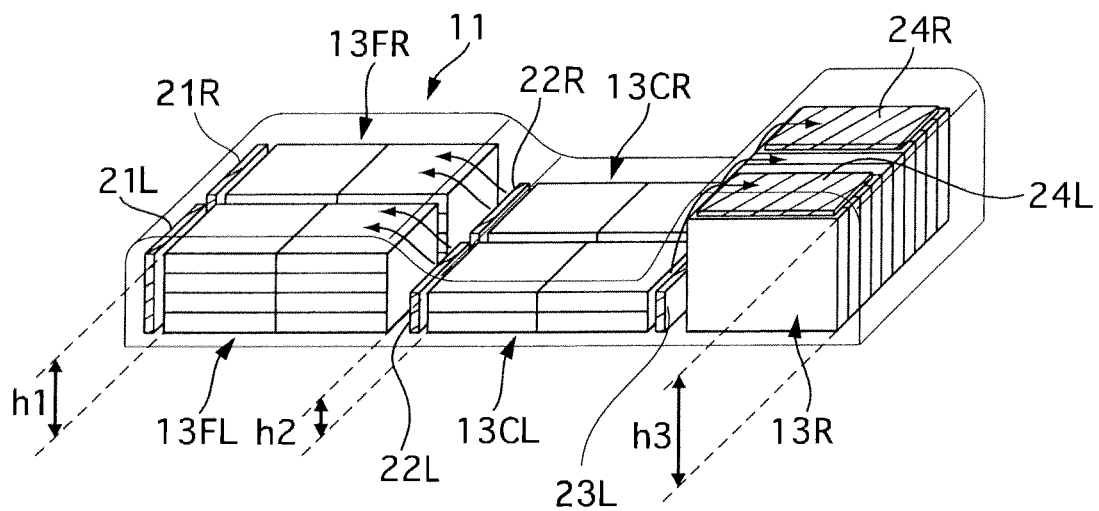
FIG. 4 is a schematic perspective view of the battery pack according to the embodiment of the present invention.

FIG. 4 is a schematic perspective view of the battery shells. The battery modules are configured to satisfy $h3>h1>h2$ where h1 indicates the height of the first battery modules 13L, 13FR (hereinafter also described as the first battery module 13F) being mounted on the vehicle, h2 indicates the height of the second battery modules 13CL, 13CR (hereinafter also described as the second battery module 13C) being mounted on the vehicle, and h3 indicates the height of the third battery module 13R being mounted on the vehicle. Moreover, the upper surface of the battery pack case 14 is formed to substantially follow the height relationship among the first to third battery modules 13F, 13C, 13R. Specifically, the upper surface of the battery pack case 14 is formed in such a way that a portion of the upper surface above the second battery module 13C is formed the lowest, that a portion of the upper surface above the first battery module 13F is formed higher than the previous one, and that a portion of the upper surface above the third battery module 13R is formed the highest.

The first battery module 13F is located below the left and right front seats 6, whereas the third battery module 13R is located below the left and right rear seats 7. Accordingly, making the heights h1, h3 larger than the height h2 makes it possible to effectively use a space of the vehicle cabin 2 below the seats as a space for mounting the battery shells 12, and thus to mount a large number of batteries without impairing the comfort in the vehicle cabin 2. Further, since the height h3 is larger than the height h1, the seat surface of each left and right rear seats 7 is higher than the seat surface of each left and right front seats 6 in the vehicle cabin 2. With this setting, a good field of view for passengers on the left and right rear seats 7 can be ensured.

In this embodiment, a total number of the battery shells 12 in the first battery module 13F and the second battery module 13C and a total number of the battery shells 12 in the third battery module 13R are the same. In the meantime, in a plan view of the vehicle, the area occupied by the third battery module 13R is smaller than the area occupied by the first battery module 13F and the second battery module 13C. As a consequence, the position of the center of gravity of the battery pack 11 is located in a relatively rear portion of the vehicle in the vehicle front-rear direction. Since the electric motor for traveling and the like are disposed in a front portion of the vehicle, placing the position of the center of gravity of the battery pack 11 in the relatively rear portion enables a position, around which the vehicle's overall weight is distributed, to be made closer to the center in the front-rear direction. Thereby, the reliability of the vehicle's behavior can be ensured.

Figure 5:
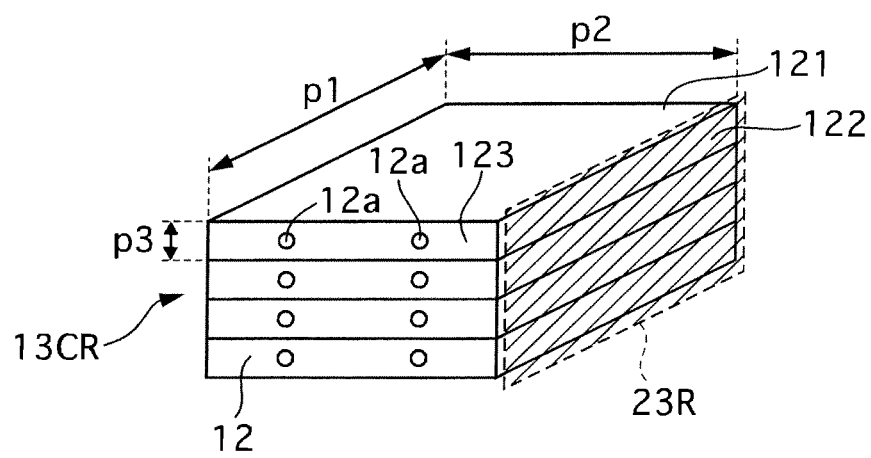
FIG. 5 is a schematic perspective view showing a second battery module according to the embodiment of the present invention.

The configuration of the battery shells 12 is described here. FIG. 5 is a schematic view showing the second battery module. Each battery shell 12 is shaped substantially like a rectangular solid, and has a long side p1, a short side p2, and a height side p3. The lengths of these sides are designed to have a size relationship of $p1>p2>p3$. The battery shell 12 has a flat surface 121 surrounded by the long side p1 and the short side p2, a long side surface 122 surrounded by the long side p1 and the height side p3, and a short side surface 123 surrounded by the short side p2 and the height side p3. The electrode terminals 12a are provided to the short side surface 123.

The first battery module 13F and the second battery module 13C are disposed in such a direction that the short side p2 of each battery shell 12 extends in the vehicle front-rear direction. The first battery module 13F and the second battery module 13C are modules disposed in a region where the restriction in a height direction is relatively stricter than the restriction in a width direction. Accordingly, even when the modules are disposed in such a way that the long side p1 extends in the vehicle width direction, it is possible to secure a space between the left and right battery modules and thus to facilitate the wiring work and the like. In addition, the density at which the battery shells 12 are integrated can be increased by disposing the modules in such a way that the short side p2 extends in the vehicle front-rear direction. Further, the height of each battery module can be adjusted finely by disposing the modules in such a way that the height side p3 having the shortest length extends in the vehicle up-down direction.

In other words, in the case where vehicles have different restrictions in the vehicle up-down direction but their battery shells 12 have a common configuration, the height can be adjusted by how many battery shells 12 are stacked. Hence, the battery shells 12 can be mounted effectively by a finer adjustment unit.

The third battery module 13R is disposed in such a way that the height side p3 of each battery shell 12 extends in the vehicle width direction. This makes it possible to finely adjust the number of the stacked battery shells 12 and thus to dispose a large number of battery shells 12 by effective use of a space below the left and right rear seats 7.

(About Thin Heater Module)

Next, based on FIGS. 2 and 3, a description is given below of thin heater modules (heater modules) used to heat the battery modules for preventing the modules from being frozen while being unused, for example. Note that, in FIGS. 2 and 3, the thin heater modules are hatched for the sake of convenience to clearly show them. Each thin heater module is a so-called PTC heater configured to vary its resistance value so as to keep a predetermined temperature once the heater is heated to this temperature after powered on. The heater module is configured to be capable of heating a region of the set area evenly by a combination of this PTC heater and a uniform heat distribution plate for distributing heat evenly. Note that a method for the heater is not limited to a particular one but any method can be employed, including a method of disposing nichrome wires in a meandering manner and a method of circulating hot water along a predetermined flow passage, for example.

As shown by a hatched region in FIG. 5, thin heater modules 23L, 23R are each provided adjacent to the long side surfaces 122 of the battery shells 12. This is due to the following reasons. To heat the entire battery module effectively, it is necessary to transmit heat to the stacked battery shells 12 evenly. If the thin heater module is provided on the flat surface 121, the heater module only heats the battery shell 12 of an uppermost layer or a lowermost layer which is adjacent to the thin heater module. Hence, the battery shells 12 of a middle layer portion in the up-down direction are heated insufficiently, making it difficult to stabilize the module's performance.

Meanwhile, if the thin heater module is provided on the short side surfaces 123, it is possible to heat all the battery shells 12. However, since an area in which the thin heater module faces each battery shell is small, there is a problem of low heating efficiency.

To cope with this, in this embodiment, the thin heater modules 23L, 23R are provided opposed to the long side surfaces 122 in order to heat all the battery shells 12 evenly as well as to improve the heating efficiency.

As described previously, the first battery modules 13FL, 13FR located at the front left and right are modules with large heat capacity made by stacking four battery shells 12. On the other hand, as described previously, the second battery modules 13CL, 13CR located at the middle left and right are made by stacking two battery shells 12, and therefore the modules have small heat capacity and their temperature is likely to drop.

To handle this, in this embodiment, as shown in FIGS. 2 and 3, thin heater modules 21L, 21R are provided only in front of the first battery modules 13FL, 13FR located at the front left and right. In the meantime, thin heater modules 22L, 22R are provided in front of the second battery modules 13CL, 13CR located at the middle left and right, and the thin heater modules 23L, 23R are provided behind the second battery modules 13CL, 13CR as well. Note that the thin heater modules 21L, 21R are disposed only in front of the first battery module 13F because the front portion of the first battery module 13 is susceptible to traveling wind and the like and thus likely to be cooled relatively. In addition, it is possible to reduce a cost by making narrow a region for installing each thin heater module.

Note that, as shown by the arrows of FIG. 4, the air warmed by the thin heater modules 22 for heating the second battery module 13C moves upward. The first battery module 13F can also be heated by this warm air. Likewise, the air warmed by the thin heater modules 23 for heating the second battery module 13C moves upward. The third battery module 13R can also be heated by this warm air. In other words, since the second battery module 13C is located lower than the other battery modules, this positional relationship is used to heat the other battery modules. Particularly in the case where the upper surface of the battery pack case 14 is formed to substantially follow the height relationship among the first to third battery modules 13F, 13C, 13R as described above, the warmed air reliably flows to a portion above the first and third battery modules 13F, 13R. Thus, the heating performance of the first and third battery modules 13F, 13R is improved. Owing to the above operation and effect, the third battery module 13R can achieve a sufficient heating performance without providing any thin heater module 24 in the middle portion in the vehicle width direction.

The third battery module 13R located at the rear is different in stacking direction from the first battery module 13F and the second battery module 13C. Since the long side surfaces 122 are located on a vehicle's upper surface side, thin heater modules 24 are also disposed on the vehicle's upper surface side. Here, because the third battery module 13R has the number of the stacked battery shells 12 still larger than that of the first battery modules 13FL, 13FR located at the front left and right and thus has the largest heat capacity, its temperature is less likely to drop. However, the side surface sides of the third battery module 13R in the vehicle width direction are relatively susceptible to traveling wind and the like, and a portion around the center of the third battery module 13R in the vehicle width direction is least likely to be cooled. With these taken into consideration, thin heater modules 24L, 24R are provided only in two end regions in the direction in which the battery shells 12 are stacked, which are located above the third battery module 13R located at the rear.

More specifically, when regions made by dividing the third battery module in the stacking direction into three are set, the thin heater modules 24L, 24R are installed in the respective two end regions but not in a middle region. Thereby, it is possible to heat the entire third battery module 13R effectively even when a region for installing each thin heater module is narrow. In addition, it is possible to reduce a cost by making narrow the region for installing each thin heater module.

The thin heater modules 21L, 21R are attached to a battery module placing surface 14a of the battery pack case 14 while disposed upright adjacent to front sides of the front-left-side battery module 13FL and the front-right-side battery module 13FR, respectively.

The thin heater modules 22L, 22R are attached to the battery module placing surface 14a of the battery pack case 14 while disposed adjacent to front sides of the middle-left-side battery module 13CL and the middle-right-side battery module 13CR, respectively. The thin heater modules 23L, 23R are attached to the battery module placing surface 14a of the battery pack case 14 while disposed adjacent to rear sides of the middle-left-side battery module 13CL and the middle-right-side battery module 13CR, respectively.

The thin heater modules 24L, 24R are attached to the battery module placing surface 14a of the battery pack case 14 while disposed adjacent to upper sides of the two ends of the rear battery module 13R in the direction in which the battery shells are stacked, respectively.

Meanwhile, as described previously, the battery power cables are routed in the space located in the middle portion in the vehicle width direction and between the first battery modules 13FL, 13FR located at the front left and right, and in the space located in the middle portion in the vehicle width direction and between the middle left and right second battery modules 13CL, 13CR. For this reason, it is preferable to install the electrode terminals of the thin heater modules 21L, 21R, 22L, 22R, 23L, 23R, 24L, 24R on a side closer to the space located in the middle portion in the vehicle width direction and between the first battery modules 13FL, 13FR located at the front left and right and to the space located in the middle portion in the vehicle width direction and between the middle left and right second battery modules 13CL, 13CR.

To achieve this, the electrode terminals of the thin heater modules 21L, 21R disposed upright adjacent to the front sides of the front-left-side battery module 13FL and the front-right-side battery module 13FR are disposed in one end portions of the thin heater modules 21L, 21R which are closer to each other than the other end portions, respectively. Moreover, the electrode terminals of the thin heater modules 23L, 23R disposed adjacent to the rear sides of the middle-left-side battery module 13CL and the middle-right-side battery module 13CR are disposed in one end portions of the thin heater modules 23L, 23R which are closer to each other than the other end portions, respectively.

Accordingly, the thin heater modules 21L, 21R and the thin heater modules 23L, 23R can be shaped like a flat plate as shown in FIGS. 2 and 3.

Here, the electrode terminals of the thin heater modules 21L, 21R can be disposed in the above way because there is no battery module, which is adjacent to the front-left-side battery module 13FL or the front-right-side battery module 13FR, in front of the battery modules 13FL, 13FR and hence a space for installing the electrode terminals can be secured around the one end portions of the thin heater modules 21L, 21R which are closer to each other than the other end portions.

Additionally, the electrode terminals of the thin heater modules 23L, 23R can be disposed in the above way because there is no battery module, which is adjacent to the middle-left-side battery module 13CL or the middle-right-side battery module 13CR, behind the battery modules 13CL, 13CR and hence a space for installing the electrode terminals can be secured around the one end portions of the thin heater modules 23L, 23R which are closer to each other than the other end portions.

Hereinbelow, the operation and effect of the embodiment of the present invention are described.

(1) The in-vehicle battery of the embodiment of the present invention includes: the second battery module 13C (one battery module) located below the floor panel 8 of the vehicle; the third battery module 13R (different battery module) provided adjacent to one side (rear side) of the second battery module 13C in the vehicle front-rear direction and being higher than the second battery module 13C; and the thin heater module 24 (heater module) provided in each of the two end regions, which are located above the third battery module 13R in the vehicle up-down direction and include no middle region in the vehicle width direction, in such a way as to be opposed to the side surface of the third battery module 13R, and configured to heat the third battery module 13R.

Specifically, since the third battery module 13R is higher than the second battery module 13C, the middle portion in the vehicle width direction is less susceptible to the external air and thus less likely to be cooled. Accordingly, by installing the thin heater module 24 in each of the two end regions not including the middle region in the vehicle width direction, it is possible to achieve a sufficient heating performance while reducing a cost. This also makes it possible to effectively use a space of the vehicle cabin 2 below the floor panel 8 as a space for mounting the battery shells 12, and thus to mount a large number of batteries without impairing the comfort in the vehicle cabin 2.

(2) The in-vehicle battery of the embodiment of the present invention includes: the battery module located below the floor panel 8 of the vehicle and including, in the order from the front of the vehicle, the first battery module 13F located below the front seat and having the first height h1, the second battery module 13C located below the floor panel 8 at a position under a feet area of the rear seat between the front seat and the rear seat and having the second height h2 lower than the first height h1, and the third battery module 13R located below the rear seat and having the third height h3 higher than the first height h1; and the thin heater module 24 (heater module) provided in each of the two end regions, which are located above the third battery module 13R in the vehicle up-down direction and include no middle region of the third battery module 13R in the vehicle width direction, in such a way as to be opposed to the side surface of the third battery module 13R, and configured to heat the third battery module 13R.

Specifically, since the third battery module 13R is installed below the rear seat, the restriction in the height direction is relatively loose. By installing the thin heater module 24 in a portion whose restriction is loose in the above manner, it is possible to install the thin heater module effectively while avoiding another restriction. In addition, as to the third battery module 13R, the battery shells 12 are stacked in the vehicle width direction and the thin heater module 24 is installed above these battery shells. This makes it possible to secure a space in the vehicle width direction sufficiently and thus to install the battery shells 12 effectively. Besides, the third battery module 13R is larger in cubic capacity than the first battery module 13F or the second battery module 13C and thus has larger heat capacity than these battery modules. In particular, its middle portion in the vehicle width direction is less susceptible to the external air and thus less likely to be cooled. Accordingly, by installing the thin heater module 24 in each of the two end regions not including the middle region in the vehicle width direction, it is possible to achieve a sufficient heating performance while reducing a cost. This also makes it possible to effectively use a space of the vehicle cabin 2 below the seat as a space for mounting the battery shells 12, and thus to mount a large number of batteries without impairing the comfort in the vehicle cabin 2.

(3) The thin heater module 21 is disposed in front of the first battery module 13F in the vehicle front-rear direction.

Specifically, the first battery module 13F disposed in the front portion of the vehicle is susceptible to traveling wind and the like and thus likely to be cooled. By installing the heater module only in a portion likely to be cooled in the above manner, it is possible to reduce a cost while ensuring the heating performance. Here, the first battery module 13F is larger in cubic capacity than the second battery module 13C, and thus has larger heat capacity than the second battery module 13C. Accordingly, a side of the first battery module 13F, which is closer to the rear of the vehicle, is less likely to be cooled relatively. For this reason, it is possible to achieve a sufficient heating performance even when the thin heater module 21 is installed only in the front portion of the vehicle. Besides, since the first battery module 13F is installed below the front seat, it is difficult to secure enough space in the height direction for the first battery module 13F. To cope with this, the battery shells 12 are stacked in the vehicle up-down direction in such a way that their long side surfaces 122 are disposed along the vehicle width direction. Thereby, the battery shells 12 can be disposed effectively.

(4) The thin heater modules 22, 23 are disposed in front of and behind the second battery module 13C in the vehicle front-rear direction, respectively.

Specifically, although located in a middle portion of the battery pack 11, the second battery module 13C is smaller in cubic capacity than the other battery modules, and thus has a smaller heat capacity than the other battery modules and is likely to be cooled. To handle this, the thin heater modules 22, 23 are disposed both in front of and behind the second battery module 13C in the vehicle front-rear direction. Thereby, the heating performance can be ensured. Note that, since the second battery module 13C is installed below the floor panel 8 at a position under the feet area of the rear seat between the front seat and the rear seat, it is difficult to secure enough space in the height direction for the second battery module. To cope with this, the battery shells 12 are stacked in the vehicle up-down direction in such a way that their long side surfaces 122 are disposed along the vehicle width direction. Thereby, the battery shells 12 can be disposed effectively.

(5) The battery modules 13F, 13C, 13R are each made by stacking multiple battery shells 12 each shaped in the form of a rectangular solid and having three sides, and each of the thin heater modules 21, 22, 23, 24 is provided upright opposed to a side surface of the corresponding battery module 13, the side surface including a side extending in the stacking direction of the battery module 13.

Specifically, each of the thin heater modules 21, 22, 23, 24 is provided opposed to the side surface including the side extending in the stacking direction. Thereby, all the battery shells 12 evenly. Further, since the heating is carried out inside the battery pack case 14, the heating efficiency can be improved.

(6) The battery shells 12 are each shaped in the form of a rectangular solid having a long side p1, a short side p2, and a height side p3 shorter than these two sides, the stacking direction is a direction extending along the height side p3, and each of the thin heater modules 21, 22, 23, 24 is provided upright opposed to the long side surface 122 being the side surface including the long side p1.

Specifically, by stacking the battery shells 12 in the direction extending along the shortest height side p3, it is possible to finely adjust the length of each battery module 13 in the direction extending along the height side p3 and thus to mount the battery module in the vehicle effectively.

In addition, because each heater module is provided upright opposed to the long side surface 122, it is possible to heat all the battery shells 12 evenly and to improve the heating efficiency.

Note that, the entire contents of Japanese Patent Application No. 2011-054090 (filed on Mar. 11, 2011) and Japanese Patent Application No. 2012-028462 (filed on Feb. 13, 2012) are incorporated herein by reference.

Besides, although the contents of the present invention have been described based on the embodiment, it is obvious to those skilled in the art that the present invention is not limited to such description but various modifications and improvements can be made thereto.

INDUSTRIAL APPLICABILITY

According to the in-vehicle battery of the present invention, since the different battery module is higher in the height direction than the one battery module, its middle portion in the vehicle width direction is less susceptible to the external air and thus less likely to be cooled. By use of this, by installing the heater module in each of the two end regions not including the middle region in the vehicle width direction, it is possible to achieve a sufficient heating performance while reducing a cost. This also makes it possible to effectively use a space of the vehicle cabin below the floor panel as a space for mounting the battery modules, and thus to mount a large number of batteries without impairing the comfort in the vehicle cabin.

REFERENCE SIGNS LIST 1 vehicle body
2 vehicle cabin
3 motor room
4 left and right front wheels
5 left and right rear wheels
6 front seats
7 rear seats
8 floor panel
11 battery pack
12 battery shell
12a electrode terminal of battery
13FL front-left-side battery module
13FR front-right-side battery module
13CL middle-left-side battery module
13CR middle-right-side battery module
13R rear battery module
14 battery pack case
14a battery module placing surface
15 motor power supply cable
21L, 21R, 22L, 22R, 23L, 23R thin heater module (heater module)

The invention claimed is:
1. An in-vehicle battery comprising:
one battery module disposed below a floor panel of a vehicle;
a different battery module provided adjacent to one side of the one battery module in a vehicle front-rear direction and having a higher height than a height of the one battery module, the different battery module comprising a first end region, a middle region, and a second end region in a vehicle width direction; and
a heater module provided, in the first and second end regions, exclusive of the middle region, above the different battery module in a vehicle up-down direction, in such a way as to be opposed to a top surface of the different battery module in the vehicle up-down direction, the heater module configured to heat the different battery module.

2. An in-vehicle battery comprising:
battery modules located below a floor panel of a vehicle and including, in an order from a front to a rear of the vehicle
a first battery module located below a front seat and having a first height,
a second battery module located below the floor panel at a position under a feet area of a rear seat between the front seat and the rear seat and having a second height lower than the first height, and
a third battery module located below the rear seat and having a third height higher than the first height, the third battery module comprising a first end region, a middle region, and a second end region in a vehicle width direction; and
a heater module provided in the first and second end regions, exclusive of the middle region, above the third battery module in a vehicle up-down direction, in such a way as to be opposed to a top surface of the third battery module in the vehicle up-down direction, the heater module configured to heat the third battery module.

3. The in-vehicle battery according to claim 2, wherein a front heater module different from the heater module is further disposed in front of the first battery module in the vehicle front-rear direction.

4. The in-vehicle battery according to claim 3, wherein a plurality of center heater modules different from the heater module and the front heater module are respectively disposed in each of portions in front of and behind the second battery module in the vehicle front-rear direction.

5. The in-vehicle battery according to claim 4, wherein
the battery modules are each made by stacking a plurality of battery shells each shaped in the form of a rectangular solid and having sides of three sizes,
each of the front heater module and the plurality of center heater modules is disposed opposed to a side surface of the corresponding battery module, the side surface including a side extending in a stacking direction of the battery shells of the corresponding battery module, and
the heater module is disposed opposed to the top surface of the third battery module, the top surface including a side extending in a stacking direction of the battery shells of the third battery module.

6. The in-vehicle battery according to claim 5, wherein
the battery shells are each shaped in the form of a rectangular solid having a long side, a short side, and a height side shorter than the long and short sides,
the stacking direction is a direction extending along the height side of the battery shells,
each of the front heater module and the plurality of center heater modules is disposed opposed to the side surface of the corresponding battery module including the long side of the battery shells of the corresponding battery module, and
the heater module is disposed opposed to the top surface of the third battery module, the top surface including the long side of the battery shells of the third battery module.

7. The in-vehicle battery according to claim 6, wherein
the first battery module and the second battery module are
formed by stacking a plurality of battery shells such that
short sides of the battery shells extend in the front-rear
direction of the vehicle, and long sides of the battery
shells extend in the vehicle width direction, and
the third battery module is formed by stacking a plurality of
battery shells such that height sides of the battery shells
extend in the vehicle width direction.

* * * * *